United States Patent [19]

Toyomura

[11] Patent Number: 4,785,312

[45] Date of Patent: Nov. 15, 1988

[54] ELECTRONIC EQUIPMENT WITH A PRINTER UNIT

[75] Inventor: Shigeru Toyomura, Kawasaki, Japan

[73] Assignee: Canon Kabushiki Kaisha, Tokyo, Japan

[21] Appl. No.: 143,290

[22] Filed: Jan. 7, 1988

Related U.S. Application Data

[63] Continuation of Ser. No. 827,540, Feb. 10, 1986, abandoned, which is a continuation of Ser. No. 466,519, Feb. 15, 1983, abandoned.

[30] Foreign Application Priority Data

Feb. 26, 1982 [JP] Japan .................................. 57-31243

[51] Int. Cl.⁴ .............................................. G01D 15/00

[52] U.S. Cl. .................................. 346/76 PH; 400/54

[58] Field of Search ............ 346/76 PH, 76 R, 139 R; 400/120, 50, 54, 51, 52; 219/216 PH; 250/316.1, 317.1, 318, 319; 364/518, 519, 520

[56] References Cited

U.S. PATENT DOCUMENTS

| | | | |
|---|---|---|---|
| 3,543,905 | 12/1970 | Albrile | 400/54 |
| 4,224,869 | 9/1980 | Morin | 400/54 |
| 4,279,523 | 7/1981 | Ringle | 400/54 |
| 4,368,491 | 1/1983 | Saito | 346/76 PH |
| 4,536,778 | 8/1985 | DeSchamphelarere et al. | 346/76 PH |

*Primary Examiner*—Arthur G. Evans

*Attorney, Agent, or Firm*—Fitzpatrick, Cella, Harper et al.

[57] ABSTRACT

An electronic equipment with a serial printer unit having a print head includes a device for laterally moving the print head on a print paper and a detector for detecting a home position of the print head, a carriage return operation is inhibited if the printer unit and paper feed are in a non-print mode when the electronic equipment is turned on.

7 Claims, 3 Drawing Sheets

ELECTRONIC EQUIPMENT WITH A PRINTER UNIT

This application is a continuation of application Ser. No. 827,540 filed Feb. 10, 1986 which was a continuation of application Ser. No. 466,519 filed Feb. 15, 1983, both abandoned.

BACKGROUND OF THE INVENTION

1. Field of the Invention

The present invention relates to a carriage return operation at the time of power-on in an electronic equipment such as a desk-top calculator with a printer unit.

2. Description of the Prior Art

Serial printer units used in desk-top calculators include a thermal printer, a mechanical printer, an ink jet printer and an electrosion printer. The printer unit of this type usually has a print head for printing on a journal paper, a drive motor for laterally moving the print head and a detection switch for detecting if the print head is positioned at a start of print position (home position) at a right end of the journal paper. The electronic equipment of this type further has a print mode designation switch for designating a print operation of the printer unit. In a prior art electronic equipment, one line space carriage return operation is carried out at the time of power-on whether the designation switch designates a print mode or a non-print mode.

The reason therefor is as follows. If the print head is not at the home position when the power is turned on, for example, when the power is turned off during the print operation and one line of print operation is not completed, and if a print operation is resumed immediately after the power-on, the characters are printed following the previously printed characters and normal print is not obtained.

In the prior art electronic equipment, however, the one line space carriage return operation is carried out even if the print mode designation switch designates the non-print mode. This results in waste of the journal paper.

SUMMARY OF THE INVENTION

It is an object of the present invention to provide an electronic equipment which inhibits the one line space carriage return operation at the time of power-on if the print mode designation switch designates the non-print mode so that the waste of the journal paper is prevented.

It is another object of the present invention to provide an electronic unit which carries out the one line space carriage return operation when the print head is not positioned at the start of print position (home position) and moves the print head to the home position.

It is a further object of the present invention to provide an electronic equipment which inhibits the one line space carriage return operation at the time of power-on if the print mode designation switch designates the non-print mode and carries out the one line space carriage return operation at the subsequent first print command prior to the print operation.

DETAILED DESCRIPTION OF THE PREFERRED EMBODIMENTS

Figure 1:
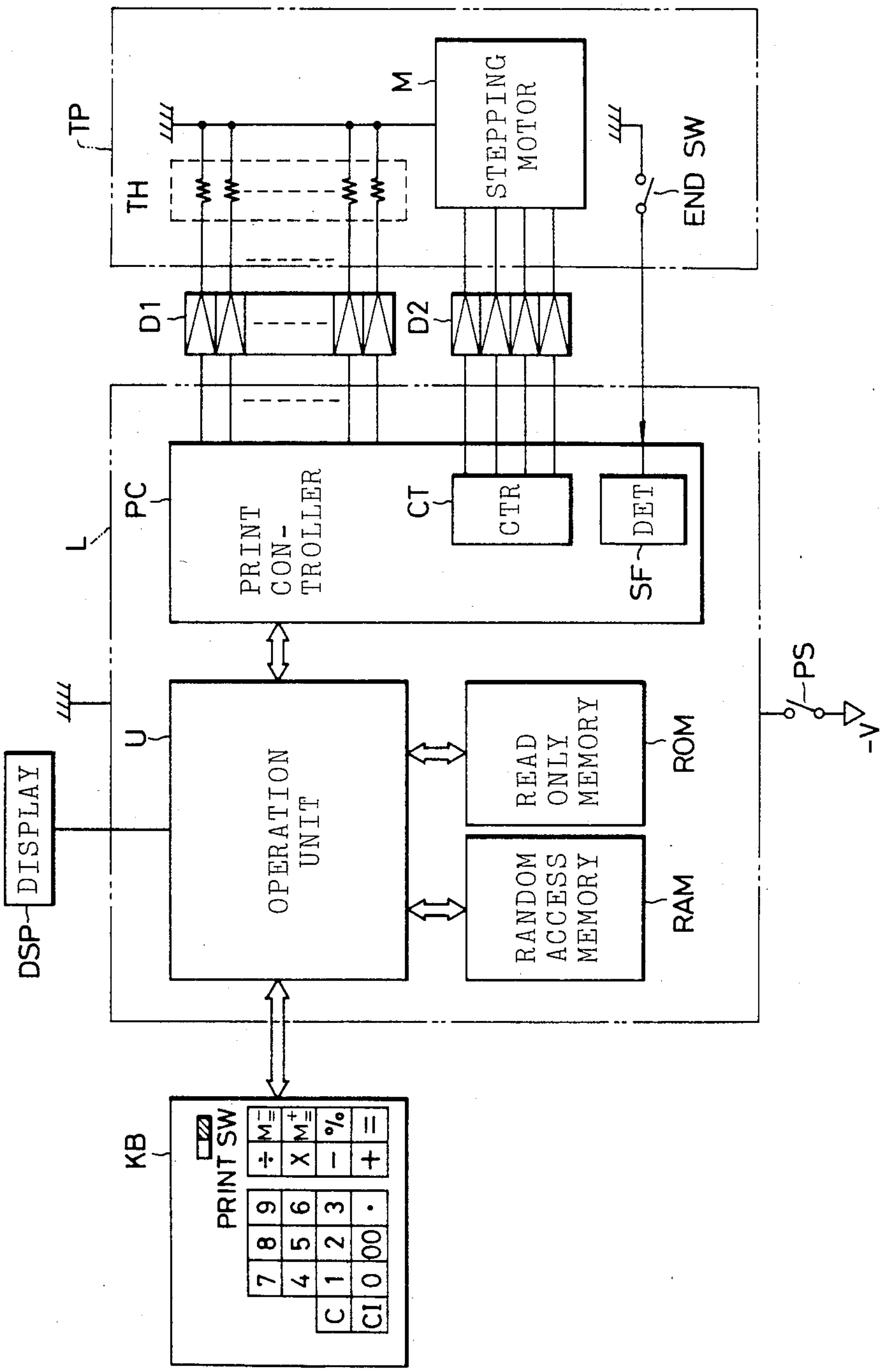
FIG. 1 shows a block diagram of an electronic equipment such as a desk-top calculator with a serial printer unit, in accordance with the present invention.

Referring to FIG. 1, KB denotes a keyboard which has numeral keys such as [1], [2], . . . , function keys such as ⊞, ⊟, ⊠, . . . and a print mode designation switch PRINT for designating a print mode.

L denotes a one-chip LSI which has the following functional units. ROM denotes a read-only memory which contains microinstruction information for sequence control. For example, it contains processing information necessary for calculator operations such as registration and arithmetic operation, and processing information necessary at the time of power-on. U denotes an operation unit which processes information in accordance with the information from the ROM and sends out an operation result to a display DSP. It comprises an adder and a control unit for supplying a key scanning signal to the keyboard KB and receiving key signals to discriminate the key and controlling RAM and PC. RAM denotes a random access memory which stores numeric data entered by the keyboard KB. PC denotes a print controller for driving a printer unit by a command from the operation unit U. It comprises a control circuit for driving a thermal print head, a counter CT for driving a stepping motor and a detector SF for detecting a signal indicating a home position.

TP denotes a thermal printer unit, and TH denotes a thermal print head having thermal elements arranged in one vertical column by seven horizontal rows, and M denotes a four-phase stepping motor for laterally moving the thermal print head TH on the thermal print paper. END SW denotes an end switch which is closed when the thermal print head TH is at the home position and opened when the thermal print head TH is moved to the left (high digit position) to print characters so that it detects whether the thermal print head TH is positioned at the home position.

In the thermal printer unit shown, when the stepping motor M is driven to move the thermal print head TH from the home position to the left (high digit position) by a predetermined number of digit positions and then returned to the home position, the print paper is automatically spaced by one print line by the motor M.

$D_1$ denotes a drive circuit for driving the thermal print head TH. $D_2$ denotes a drive circuit for driving the stepping motor M. PS denotes a power switch of the desk-top calculator.

[Operation of First Embodiment]

The operation of the first embodiment of the present invention thus constructed is explained with reference to a flow chart of FIG. 2.

Figure 2:
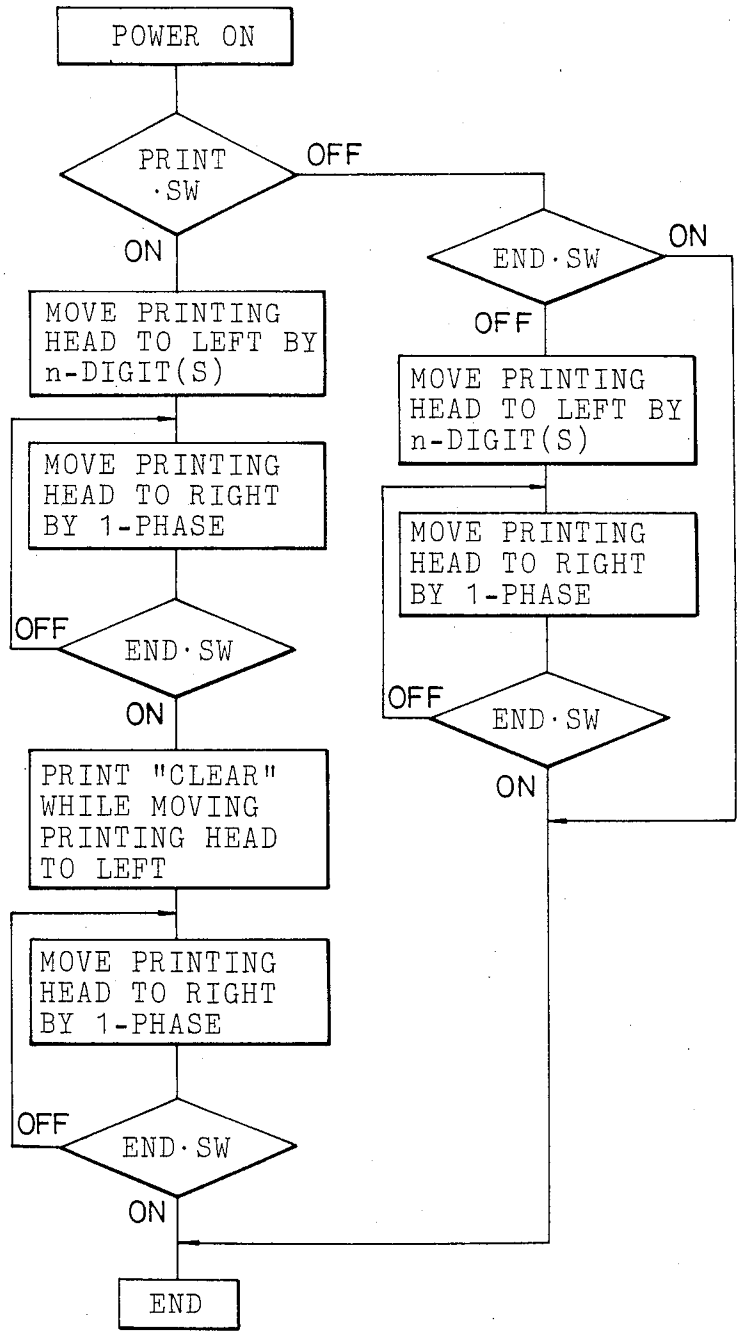
FIGS. 2 and 3 show flow charts for control operations of first and second embodiments of the present invention.

When the power switch PS of FIG. 1 is turned on, the power is supplied to the unit L, which starts the processing of FIG. 2 in accordance with the information stored in the ROM. When the power is turned on, the on-off condition of the print switch is checked to determine whether the print mode designation switch designates the print mode or the non-print mode. If it is on, an ON branch is selected and the print head is moved to the left by n digit positions. The n digits correspond to a time necessary to return the carriage with one line space. Usually, n is 8 to 10. Then, the print head is moved to the home position which is one dot position rightward (low order digit) therefrom, by a command "Move print head to right by 1 phase". Then, the on-off status of the end switch is checked by a command "END·SW". If the print head has not been returned to the home position, an OFF-branch is selected and the command "Move print head to right by 1 phase" is executed again. This is repeated until the end switch is turned on. During this period, one line space carriage return is carried out. When the print head reaches the home position, the end switch is turned on and the next step is carried out. That is, "Clear" print operation is carried out to the new line while the print head is moved leftward. After the printing, the print head is moved to the home position while the on-off state of the end switch is checked in the same manner as described above.

When the print switch is on, the one line space carriage return is carried out as described above and then "Clear" print operation is carried out.

If the print mode designation switch is off at the time of power-on, an OFF-branch is selected after the execution of the command "Print·SW", and it is checked if the print head is at the home position or not by the command "End·SW". If the print head is at the home position, the end switch is on and the ON-branch is selected and the carriage return is not carried out. However, if the print head is positioned at other than the home position, the end switch is off and the print head is moved by n digit positions to the left by a command "Move print head to left by n digits". Then, by repeating a command "Move print head to right by 1 phase" and "End·SW", the print head is moved to the home position and the one line space carriage return is carried out.

As described above, if the print switch is off to indicate the non-print mode and the print head is positioned at the home position at the time of power-on, the one line space carriage return is not carried out.

[Operation of Second Embodiment]

Figure 3A:
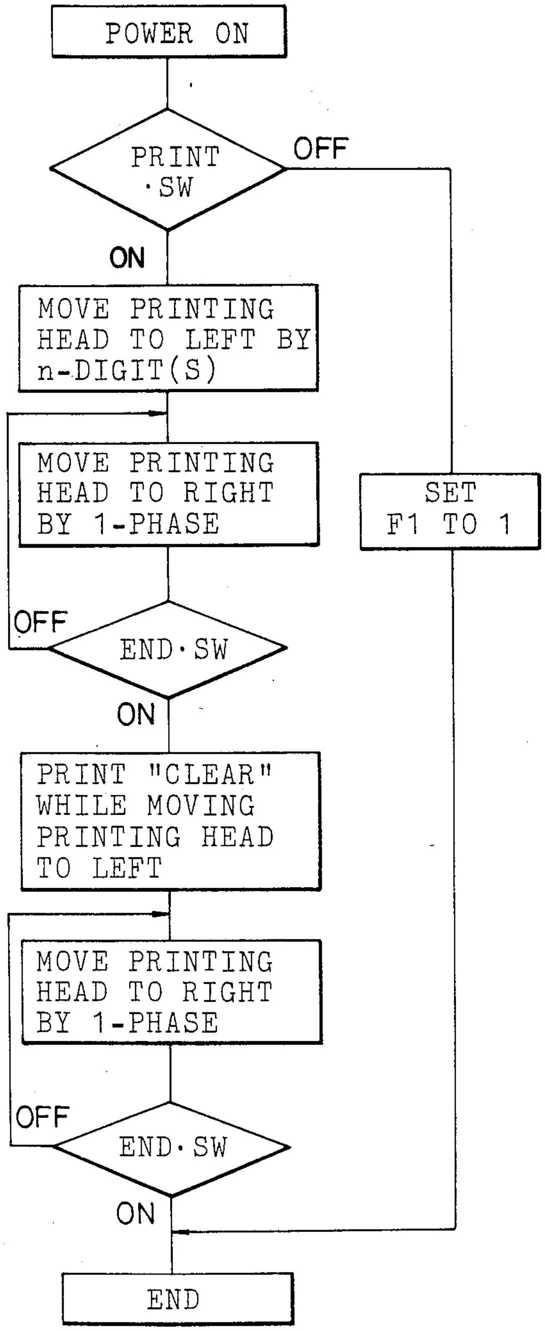
Figure 3B:
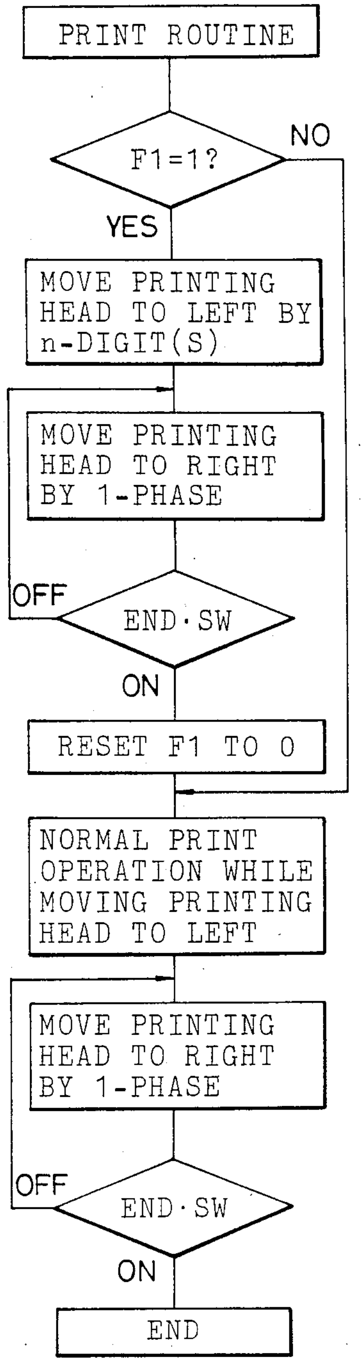

Referring to a flow chart of FIG. 3, another control operation is explained.

When the power is turned on in (A) of FIG. 3, the command "Print·SW" is executed to check the print designation mode, and if the print switch is on, the same processing as FIG. 2 is carried out, that is, one line space carriage return and "Clear" print operation are carried out and the print head is returned to the home position.

However, if the print switch is off to indicate the non-print mode, the OFF branch is selected after the execution of the command "Print·SW" and a flag $F_1$ is set. This information is stored in the RAM.

As described above, if the print switch is off, the one line space carriage return is not carried out but the flag $F_1$ is set to "1".

Referring to (B) in FIG. 3, the operation when the print switch is off at the time of power-on and the print switch is thereafter turned on and the printing of numeric data is requested, is now explained.

In a step "$F_1=1$?" in the print routine, the set condition of the flag $F_1$ is checked. If $F_1$ is "0", a NO-branch is selected and a command "Normal print operation while moving print head to left" is executed and then the print head is moved to the right to return it to the home position.

If $F_1$ is "1", it is judged that the carriage return operation was not carried out at the time of power-on and the print head is not positioned at the home position, and a YES-branch is selected to execute a command "Move print head to left by n digits" and then repeats the commands "Move print head to right by 1 phase" and "End·SW" to move the print head to the home position. Then, the one line space carriage return is carried out.

Then, the flag $F_1$ is reset to "0" by a command "Reset $F_1$ to 0" so that the carriage return is not carried out in the subsequent print routine.

Then, the command "Normal print operation while moving print head to left" is executed and the print head is moved to the home position.

This, if the print switch is off at the time of power-on, the one line space carriage return is not carried out even if the print head is not at the home position, and if a print operation is thereafter requested, the one line space carriage return is carried out at the first print operation. Accordingly, if the desk-top calculator is operated with the print switch kept off, the one line space carriage return is not carried out at the time of power-on.

As described hereinabove, according to the present invention, the one line space carriage return is inhibited at the time of power-on if the non-print mode is designated so that the waste of the print paper is prevented.

What I claim is:

1. Electronic equipment having a printer unit adapted to be fed with print paper, comprising:
 - a print head;
 - drive means for moving said print head relative to the print paper;
 - paper feed drive means for feeding print paper to the printer unit in response to movement of said print head;
 - detection means for detecting the presence of said print head at a home position thereof, wherein said paper feed drive means is actuated by the return of said print head to the home position;
 - a print switch for selectively causing the printer unit to assume a print mode wherein said print head is moved for printing characters and a non-print mode;
 - a power switch; and
 - control means adapted to actuate said print paper feed drive means for feeding print paper, in response to said power switch being in a turned on state, if a first set of conditions are met and not if a second set of conditions are met; the first set of conditions including first and second conditions, the first condition being that said detection means fails to detect the presence of said print head at the home position and the second condition being that said print switch is in the print mode, and the second set of conditions including that said print switch is in a non-print mode.

2. Electronic equipment having a printer unit adapted to be fed with print paper, comprising:
 - a print head;
 - drive means for moving said print head relative to the print paper;
 - paper feed drive means for feeding print paper to the printer unit in response to movement of said print head;
 - detection means for detecting the presence of said print head at a home position thereof, wherein said paper feed drive means is actuated by the return of said print head to the home position;
 - a print switch for selectively causing the printer unit to assume a print mode wherein said print head is moved for printing characters and a non-print mode;

a power switch; and control means adapted to actuate said paper feed drive means for feeding print paper in response to said power switch being turned on if a first set of conditions are met and not if a second set of conditions are met; the first set of conditions including first and second conditions, the first condition being that said detection means fails to detect the presence of said print head at the home position and the second condition being that said print switch causes selection of the non-print mode.

3. Electronic equipment having a printer unit adapted to be fed with print paper, comprising:

a print head;

drive means for moving said print head relative to the print paper;

paper feed drive means for feeding print paper to the printer unit in response to movement of said print head;

detection means for detecting the presence of said print head at a home position thereof, wherein said paper feed drive means is actuated by the return of said print head to the home position;

a print switch for selectively causing the printer unit to assume a print mode wherein said print head is moved for printing characters and a non-print mode;

a power switch; and control means adapted to actuate said paper feed drive means for feeding print paper, in response to said power switch being in a turned on state, if a first set of conditions are met and not if a second set of conditions are met; the first set of conditions including first and second conditions, the first condition being that said detection means fails to detect the presence of said print head at the home position and the second condition being that said print switch is in the print mode, in response to the power switch being turned on and the second set of conditions including the condition that the detecting means detects that said print head is in the home position.

4. Electronic equipment having a printer unit adapted to be fed with print paper, comprising:

a print head;

drive means for moving said print head relative to the print paper;

paper feed drive means for feeding print paper to the printer unit in response to movement of said print head;

detection means for detecting the presence of said print head at a home position thereof, wherein said paper feed drive means is actuated by the return of said print head to the home position;

a print switch for selectively causing the printer unit to assume a print mode wherein said print head is moved for printing characters and a non-print mode;

a power switch;

control means for inhibiting feeding of the print paper by preventing movement of said print head when said print switch causes selection of the non-print mode in response to said power switch being turned on if said detection means detects the presence of said print head at the home position; and releasing means for permitting said print head to return to the home position if said detection means fails to detect, at the time said power switch is turned on, that said print head is at the home position.

5. Electronic equipment having a printer unit adapted to be fed with print paper, comprising:

a print head;

drive means for moving said print head relative to the print paper;

paper feed drive means for feeding print paper to the printer unit in response to movement of said print head;

detection means for detecting the presence of said print head at a home position thereof, wherein said paper feed drive means is actuated by the return of said print head to the home position;

a print switch for selectively causing the printer unit to assume a print mode wherein said print head is moved for printing characters and a non-print mode;

a power switch; and control means adapted to inhibit feeding of the print paper by preventing movement of said print head under one set of conditions in which said print switch causes selection of the non-print mode at the time said power switch is turned on and adapted to return said print head to the home position to actuate said paper feed drive means for feeding print paper in response to the power switch being turned on under another set of conditions.

6. An electronic equipment according to claim 1, wherein said drive means includes means for moving said print head directly to the home position upon moving said print switch to the print mode.

7. An electronic equipment according to claim 3, wherein said drive means includes means for moving said print head directly to the home position upon moving said print switch to the print mode.

* * * * *

UNITED STATES PATENT AND TRADEMARK OFFICE

CERTIFICATE OF CORRECTION

PATENT NO. : 4,785,312

DATED : November 15, 1988

INVENTOR(S) : Toyomura

It is certified that error appears in the above-identified patent and that said Letters Patent is hereby corrected as shown below:

Title page, item [56]

"Fitzpatrick, Cella, Harper et al." should read --Fitzpatrick, Cella, Harper & Scinto--.

Column 4

Line 11, "This" should read --Thus,--.

Signed and Sealed this

Fifth Day of September, 1989

*Attest:*

DONALD J. QUIGG

*Attesting Officer*

*Commissioner of Patents and Trademarks*